United States Patent [19]

Neuville

[11] 3,852,677

[45] Dec. 3, 1974

[54] DEMODULATOR

[75] Inventor: Claude Neuville, Paris, France

[73] Assignee: Compteurs Schlumberger, Montrouge, France

[22] Filed: June 28, 1973

[21] Appl. No.: 374,451

[30] Foreign Application Priority Data

June 30, 1972 France ............................ 72.23729

[52] U.S. Cl. .................. 329/109, 307/234, 324/102, 328/111, 329/126

[51] Int. Cl. ............................................ H03k 9/02

[58] Field of Search ........... 329/102, 103, 104, 106, 329/109, 126; 328/111, 112; 307/234; 325/325; 324/102

[56] References Cited

UNITED STATES PATENTS

| | | | |
|---|---|---|---|
| 3,473,130 | 10/1969 | Briggs | 328/111 |
| 3,519,932 | 7/1970 | Baum et al. | 324/102 |
| 3,753,135 | 8/1973 | Kastner | 329/106 |

*Primary Examiner*—Alfred L. Brody
*Attorney, Agent, or Firm*—William R. Sherman

[57] ABSTRACT

Disclosed is a demodulator for pulses modulated by signals at a determined frequency and comprising:

a bistable memory receiving signals on its reset input, the output of this first counter being connected to the second control input of the bistable memory, a second counter whose reset control input is connected to the output of the bistable memory.

4 Claims, 2 Drawing Figures

DEMODULATOR

BACKGROUND OF THE INVENTION

This invention relates to demodulators and more particularly to demodulators of remote-control signals.

In certain remote-control systems such as centralized remote-control systems, for example, the remote-control-frequency currents are superimposed on the industrial-frequency currents going through a distribution network. The remote-control frequency is for example 175 hertz, whereas the frequency of the industrial current is generally 50–60 hertz.

The remote-control of different receivers from a transmission station uses, for example, pulse trains coded so as to act on the receivers selectively as a function of a code established in connection with each receiver.

Hence, to control the receivers, it is necessary to separate the remote-control frequency from the industrial frequency and from its harmonics. This separation can be achieved by filtering, for example. The remote-control-frequency pulses transmitted according to a particular code must then be demodulated and, in order to distinguish them from any spurious pulses coming from the network, it is necessary to check their specific amplitude and duration characteristics.

It is an object of the present invention to provide a demodulator which is perfectly suited to the demodulation of these centralized remote-control pulses and which is particularly adapted to be constructed, without any inconvenient, in monolithic integrated circuit form, for example.

SUMMARY OF THE INVENTION

Accordingly, the invention provides a demodulator for signal pulses at a predetermined frequency, said pulses having a minimum duration, characterized by the fact that it comprises:

a bistable memory receiving said signals on a first control input, a first counter receiving said signals on its reset input, the output of said first counter being connected to the second control input of said bistable memory, a second counter whose reset control input is connected to the output of said bistable memory.

Other features and advantages of the present invention will appear from the following description with reference to the appended drawing in which

DESCRIPTION OF PREFERRED EMBODIMENT

Figure 1:
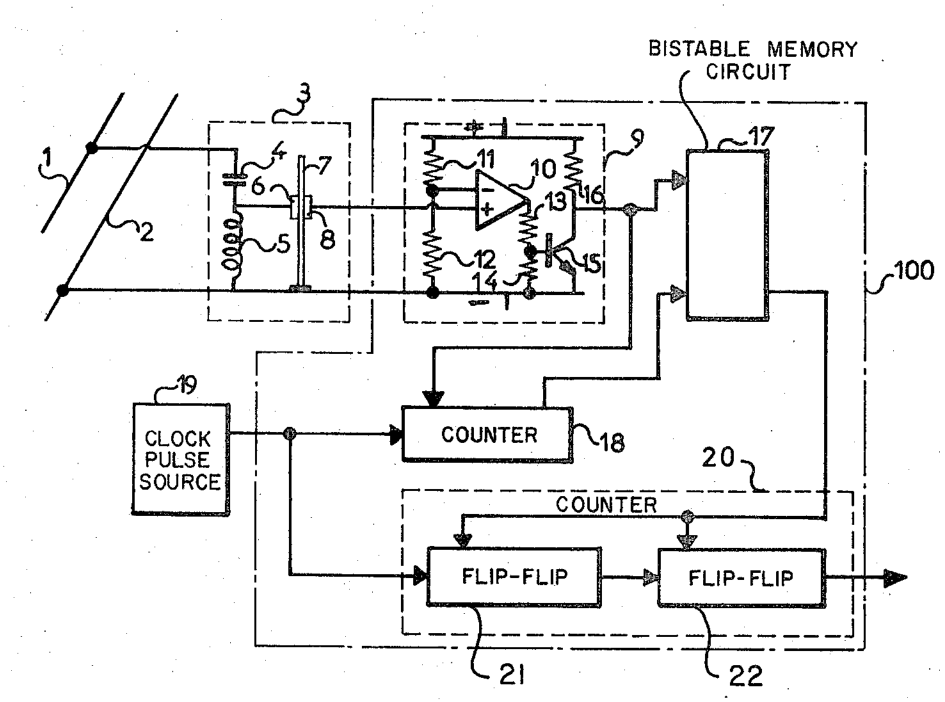
FIG. 1 is a schematic block diagram of a device according to the invention.

The device illustrated in FIG. 1 comprises a transmission line, consisting of two conductors 1 and 2 traversed by a current at an industrial frequency, for example 50 hertz, on which are superimposed pulses modulated by signals having a frequency generally higher, for example 175 hertz, than that of the line current going through conductors 1 and 2. These control pulses allow the remote-control of various receivers connected to the lines 1 and 2. The frequency of these signals forming the remote-control pulses is in general different by a whole multiple from the industrial frequency. The remote-control frequency selector allowing the separation of these pulses from the line current is made up of a filter 3 connected in parallel circuit relationship across conductors 1 and 2. This filter includes a first resonant circuit, formed by a capacitor 4 and a choke 5 connected in series, and tuned to the modulation frequency of the remote-control pulses. When this first filtering has been performed, the signal obtained at the terminals of the choke 5 is applied to a first piezoelectric stud 6 bonded on a vibrating reed 7 tuned to the modulation frequency of the remote-control pulses. On the other side of the vibrating reed 7 is fixed a second piezoelectric stud 8 substantially opposite the first stud 6.

The output of this filter 3 appears at the terminal of the second piezoelectric stud 8.

The signal obtained at the output of this filter 3 is applied to the input of the demodulator 100 which preferably comprises, at its input, a threshold circuit 9 which includes a threshold amplifier 10 whose first positive input is connected to the output terminal of the stud 8 and whose negative terminal, the potential of which defines the passage threshold of this amplifier, is connected to a "midpoint" of a voltage divider consisting of two resistors 11 and 12 connected in series between the positive potential and the negative potential. This threshold circuit 9 can comprise, if necessary, an impedance reducer made up of a voltage divider connected to the output of the amplifier 10 and consisting of two resistors 13 and 14 connecting the output of the amplifier 10 to the negative potential, and of a transistor 15 whose base is connected to the common point of the two resistors 13 and 14. The emitter of this transistor is brought to the negative potential, while the collector is brought to the positive potential through a resistor 16. The collector of this transistor 15 constitutes the output terminal of the threshold circuit 9.

The output of this threshold circuit 9 is connected to a first control input of a bistable memory 17 and to the reset control input of a first counter 18.

The count input of this first counter 18 is connected to the output of a clock 19 delivering electric reference or clock pulses at a predetermined fixed frequency. These reference pulses can be obtained, for example, from the line current. The output of this first counter is connected to the second control input of the bistable memory 17.

The output of this bistable memory 17 is connected to the reset control input of a second counter 20, made up for example of a register with several flip-flops whose count input is connected to the clock 19, the output of this counter 20 constituting the output of the demodulator. As seen in FIG. 1, counter 20 can be regarded as having a plurality of bistable circuits 21 and a final bistable circuit 22.

Figure 2:
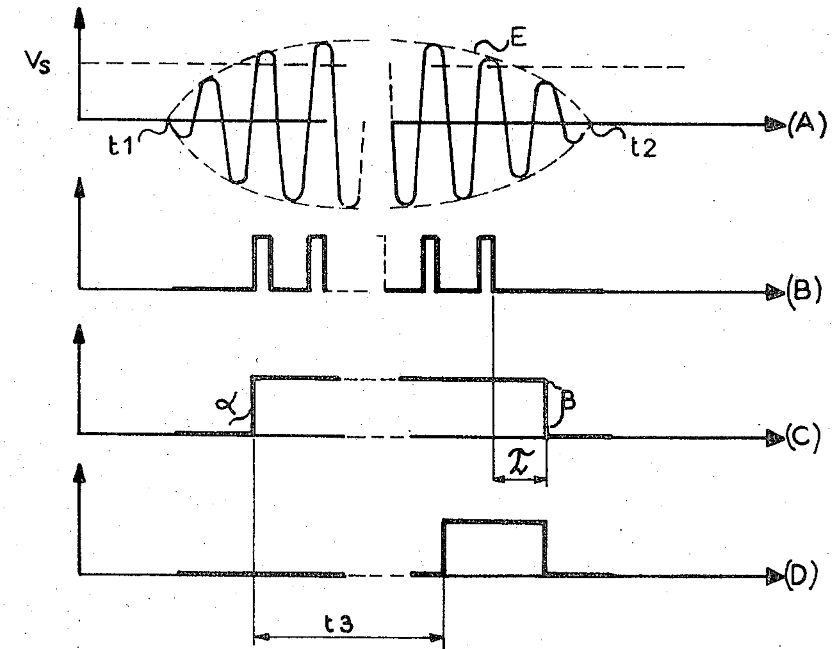
FIG. 2 represents a set of curves allowing a better understanding of the operation of the device according to the invention.

The operation of the demodulator according to the invention is as follows:

The explanation of this operation will be presented with the aid of the curves of FIG. 2. For illustrative purposes, in the rest of the description, we shall call the count time the time taken by a counter to deliver a pulse at its output from the moment it begins counting pulses.

The signal obtained at the output of the filter 3 is represented in FIG. 2A which represents a pulse having a duration equal to $t_2 - t_1$, and made up of signals having a determined frequency, the envelope E of which determines the form of a remote-control pulse. The demodulator according to the invention makes it possible to obtain, at its output, a rectangular pulse provided the pulse applied to its input has a sufficient duration and amplitude. This pulse with a duration between $t_2$ and $t_1$ is applied to the input of the threshold circuit, the threshold of which is determined with reference to FIG. 2A by the line parallel to the abscissa axis having the ordinate $V_s$. Thus, when these signals are applied to the input of the threshold circuit, the latter delivers rectangular pulses at the same frequency as that of the signals making up the remote-control pulse; this threshold circuit delivers these pulses only if the amplitude of the signals is higher than the threshold voltage $V_s$ imposed by the voltage divider made up of the two resistors 11 and 12. These rectangular pulses delivered by the threshold circuit 9 are represented in FIG. 2B.

If the threshold circuit delivers at least one pulse at its output, this pulse controls the bistable memory 17 which responds by changing from its rest or reset state to its work or set state, as illustrated at "$\alpha$" in FIG. 2C. That pulse also controls the resetting of the first counter 18 which begins to count the reference pulses delivered by the clock 19. After each pulse delivered by the threshold circuit, the counter 18 is reset and then recommences its count of the pulses delivered by the clock. By contrast, when the threshold circuit stops delivering pulses for a time longer than the count time of the counter 18, the latter then delivers a pulse which is applied to the second control input of the bistable memory 17 which then goes back automatically to its initial state as illustrated at B in FIG. 2C. The return of the bistable 17 to its normal state takes place after a time $\tau$ (FIG. 2C) after the last pulse delivered by the threshold circuit: this time $\tau$ is at most equal to the count time of the counter 18.

It was thus possible to obtain at the output of the bistable memory 17 a rectangular pulse having a length substantially equal to that obtained at the output of the filter 3, even if, within the latter, some signals did not have the required amplitude; For this, the count time of the counter 18 is determined so that it covers several signals in the pulse train of the remote-control pulse. For example, with the demodulator designed by the applicant the count time of the counter was equal to four pulses delivered by the clock 19 at the frequency of 50 hertz; this thus corresponded to a covering of about 14 signals in the pulse train a remote-control pulse which, in this case, should have had about 175; so that if, for any reason, less than 14 consecutive signals were missing from the pulse train at the output of the threshold circuit, the remote-control pulse would still be detected.

It is also necessary to determine whether the duration of this pulse obtained at the output of the bistable memory has a sufficient duration to be a remote-control pulse. In practice, these remote-control pulses have a duration of about 1 second. To assure that these pulses are indeed remote-control pulses and not spurious pulses, a minimum duration is imposed on the pulse obtained at the output of the bistable memory. For this reason, it is assumed that if the pulse obtained at the output of the bistable memory is equal to or greater than about 40 percent of the duration of the pulses theoretically sent in the line, this pulse in indeed a pulse of the remote-control pulse train. To check the duration of the pulse delivered by the bistable memory, the output of the bistable memory is connected to the reset input of the second counter 20 whose input is connected to the output of the clock 19 which delivers the electric reference pulses. The signal normally obtained at the output of the bistable memory imposes a constant resetting of the second counter 20. When the first pulse changes the state of the bistable memory to its working state, the counter 20 begins to count the pulses delivered by the clock 19; when the counter 20 reaches the end of its count time, equal to 40 percent of the duration of the remote-control pulses, and if the bistable memory has not come back to its normal state, the last bistable circuit of counter 20 then delivers a pulse at its output after a time $t_3$, counted from the first pulse delivered by the threshold circuit or, when the bistable memory has been switched to its working state. Then, when the bistable memory comes back to its normal state, it resets to zero the counter 20 and keeps it constantly there. In this case, at the output of the counter 20, a rectangular pulse appears with a form as illustrated in FIG. 2D; this pulse thus confirms that the input of the demodulator 100 has received a signal pulse with a determined frequency having a sufficient amplitude and duration. On the other hand, if the bistable memory has come back to its normal or rest state before the second counter 20 has reached the end of its count, the signal obtained at the output of the memory 17 would have reset to zero the counter 20 and kept it constantly there; so that, in this case, no signal would have appeared at the output of the counter 20; and in this manner we eliminate a pulse which stands a good chance of being a spurious pulse.

It goes without saying that the invention is not limited to the embodiment just described for illustrative purposes and that many variations can be introduced without departing from the scope of the invention.

What is claimed is:

1. A demodulator for producing a delayed output signal in response to an input signal of the type including a pulse which has been modulated at a predetermined frequency and consisting of a limited train of pulse signals at the predetermined frequency comprising bistable circuit means for receiving the input signal and for changing from a first state to a second state in response to the beginning of the first pulse of the train of pulse signals;

a source of clock pulses;

first counter means for receiving and counting clock pulses from said source and for producing a reset output signal when the count accumulated thereby reaches a predetermined total;

first circuit means for coupling said reset output signal from said first counter means to said bistable circuit means to return said bistable circuit means to said first state;

second circuit means for coupling the train of pulse signals in said input signal to said first counter means to reset said first counter means and restart the counting of clock pulses in response to each pulse received thereby;

second counter means for receiving and counting clock pulses from said source and for producing the delayed output signal representative of the arrival of an input signal, said second counter means being operative to initiate said output pulse after a preselected number of clock pulses has been counted by said second counter means; and third circuit means connected between said bistable circuit means and said second counter means for providing to said second counter means a reset signal when said bistable circuit means returns to said first state.

2. A demodulator according to claim 1 wherein the count time of said first counter means is at least equal to the time defined by two cycles of the said signals, but shorter than the duration of the input signal pulses.

3. A demodulator according to claim 2 wherein the count time of said second counter means is longer than the count time of the first counter and equal to a fraction of the minimum duration of said input signal pulse.

4. A demodulator for producing a delayed output signal in response to an input signal of the type including a pulse which has been modulated at a predetermined frequency and consisting of a limited train of pulse signals at the predetermined frequency comprising:

a threshold circuit for receiving the input signal and for delivering shaped signals having amplitude values at least equal to the value of the threshold, a bistable memory circuit having a first control input connected to the output of said threshold circuit and a second control input;

a clock pulse source;

first counter circuit means for counting pulses from said source, said circuit means having a reset input connected to the output of said threshold circuit, the output of said first counter being connected to said second control input of said bistable memory, the count time of said first counter being at least equal to the time defined by two cycles of the train of pulse signals, but shorter than the duration of the input signal; and second counter circuit means for counting pulses from said source, said second counter circuit means having a reset control input connected to the reset output of said bistable memory, the count time of said second counter being longer than the count time of the said first counter and equal to a fraction of the minimum duration of the input signal pulse.

* * * * *